Aug. 11, 1964  R. G. JORGENSEN  3,144,060
LUMBER FEED GUIDE
Filed March 22, 1962
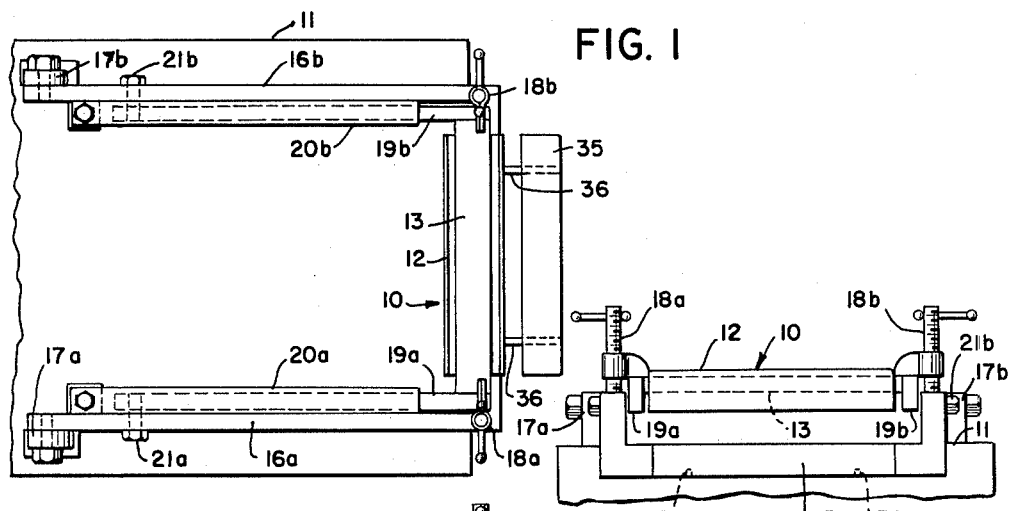
FIG. 1
FIG. 3
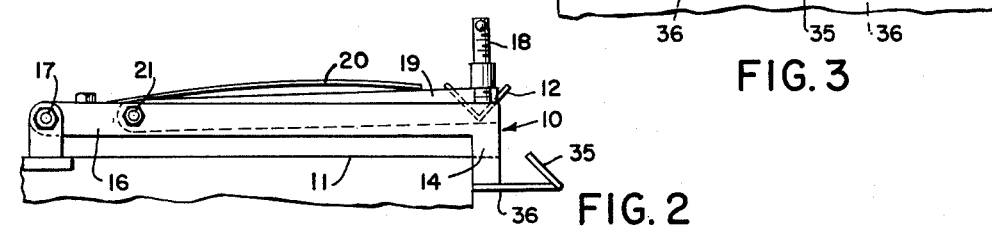
FIG. 2
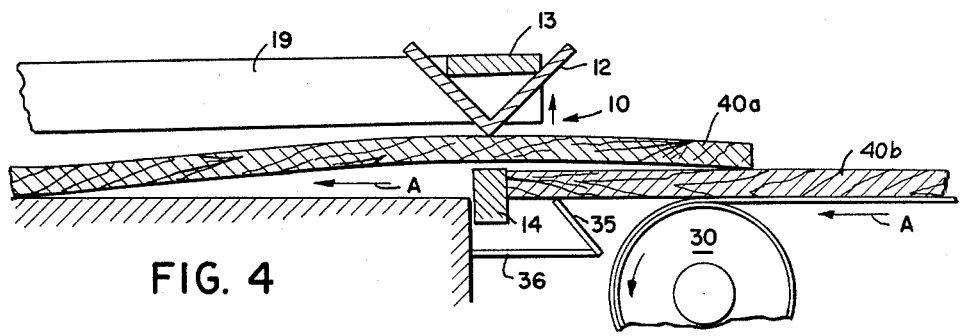
FIG. 4
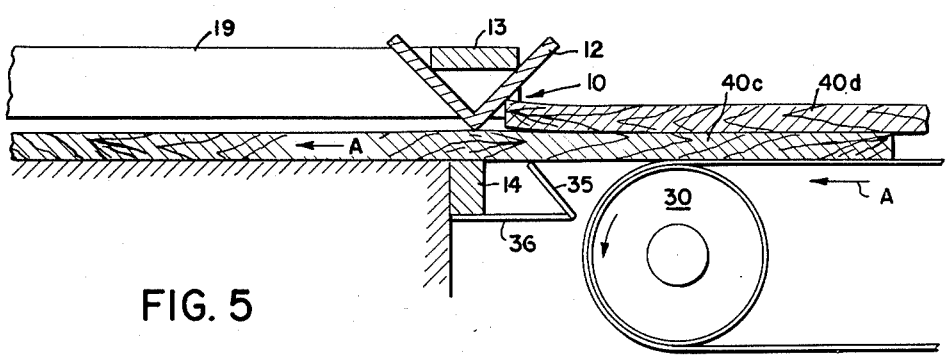
FIG. 5

# 3,144,060
LUMBER FEED GUIDE
Robert G. Jorgensen, Memphis, Tenn., assignor to Jorgensen-Wellford, Inc., Memphis, Tenn., a corporation of Tennessee
Filed Mar. 22, 1962, Ser. No. 181,761
4 Claims. (Cl. 144—242)

This invention relates to a guide for feeding lumber boards and the like and, more particularly, to a lumber feed guide for dispensing boards one at a time to the infeed of a work tool station from a conveyor travelling at a faster rate.

It is common practice when performing lumber planing or milling operations to have the work tool set up to receive the cut lumber boards from a feed (typically a conveyor belt) that travels at a much faster rate than the infeed of the work tool itself. This is done so as to ensure that no gap appears between the ends of successive boards as they pass through the work tool. However, if a board is slightly crooked, there is a possibility that its end may pass over the end of the board immediately preceding it to the work tool. In such a case the doubled-up boards would then be carried from the conveyor belt, through the infeed rolls of the machine and then either be cut to pieces or jammed up in the work tool. Similarly, a board of uneven thickness or bend may raise up as it passes through the infeed rolls of the planer or milling machine and thereby permit the following board to partially slide under it, with the same undesirable results. Therefore, the need exists for an apparatus for guiding the lumber into the work tool which will prevent such occurrences, due to the doubling-up of the boards as they pass into the feed rolls of the work tool station, from happening and permit only one board at a time to pass from the conveyor belt to the relatively slower turning infeed rolls of the work tool.

The lumber feed guide of the present invention achieves these objectives in a novel manner. In an illustrative embodiment, the guide comprises upper and lower split-yoke portions spaced apart to form a gate or passageway positioned across the infeed of a machine tool through which the cut lumber boards are successively fed at a high rate by a conveyor. The gate is restrained in such a manner that only movement in a substantially vertical direction (i.e., perpendicular to the plane of travel of the advancing lumber boards) is permitted. Means are provided to permit the height of the gate to be adjusted such that it substantially corresponds to the nominal thickness of boards being fed through the guide.

In operation the gate lies across the plane of travel of the lumber boards from the conveyor belt to the bed of the work tool station and, therefore, boards pass successively through the opening of the guide without interference. On occasion, as the boards are fed at a relatively high rate from the conveyor belt, the forward end of a following board may slide under or over the trailing edge of the board being engaged by the work tool due to warping or unevenness in the thickness or bend of the boards. With the present invention, the trailing end of the board immediately being engaged by the work tool will elevate the gate of the guide such that the lower yoke portion is raised into the plane of travel and acts as a stop to prevent forward feed of the board following, if its forward end lies underneath the first board. The gate will so remain in an elevated position until the first board has passed completely through, whereupon the guide will lower automatically such that the gate again lies in the plane of travel thereby permitting the following board to pass through, i.e. between the split-yoke portions, without interference. On the other hand, should a following board overlap the top of a board preceding it into the work tool, the upper half of the split-yoke, which is spaced above the lower yoke portion by the nominal board thickness plus a small clearance, will then act as a stop and block forward feed of the following board through the guide until the first board has completely passed through the gate.

It is therefore a principal objective of the present invention to provide a guide for feeding lumber boards and the like individually from a conveyor to a work tool.

It is a further objective of the present invention to provide a lumber feed guide for preventing boards from being supplied to a work tool station in an overlapping or doubled-up condition.

It is still another objective of the present invention to provide a lumber feed guide positioned before the infeed of a work tool which ensures that successive boards are dispensed individually to the tool from a conveyor operating at a higher speed than the infeed of the work tool.

The foregoing and other objectives, features, and advantages of the invention will be more readily understood upon consideration of the following detailed description of the invention, taken in conjuction with the accompanying drawings.

FIG. 1 is a plan view of an illustrative embodiment of the present invention showing the lumber feed guide secured to the bed at the infeed side of a work tool station.

FIG. 2 is a side elevational view of the lumber feed guide embodiment of FIG. 1.

FIG. 3 is a front elevational view of the lumber feed guide embodiment of FIG. 1.

FIG. 4 is a partially fragmentary, side elevational view of the lumber feed guide embodiment of FIG. 1, with certain parts omitted, showing the guide in operation preventing the passage of a board riding underneath a preceding board.

FIG. 5 is a partially fragmentary, side elevational view of the lumber feed guide embodiment of FIG. 1, with certain parts omitted, showing the guide in operation preventing the passage of a board carried on top of a preceding board.

Referring now to FIGS. 1–3, there is shown therein an illustrative embodiment of the present invention. The lumber feed guide, designated generally as 10, is placed across the bed 11 of a work tool station ahead of the infeed rolls (not shown) and comprises a split-yoke having an upper portion 12, formed of an angle iron carried on a cross-brace member 13, and a lower portion 14. The split-yoke portions are spaced apart to form a gate area therebetween which corresponds to the nominal thickness and width dimensions of the lumber boards which are to pass through the guide. As will be hereinafter explained, suitable means are provided for adjusting the height of the gate, i.e. the separation between the halves of the split yoke, to adjust the guide for boards of a different thickness.

The lower half 14 of the split-yoke is formed integral with a pair of arm members 16a, 16b which extend back towards the infeed and pivotally support the guide 10 at 17a, 17b from the bed 11 of the work tool station. As shown in the figures, the lumber feed guide 10 abuts over the end of the bed 11 such that as cut lumber boards are advanced, from right to left, from a conveyor to the infeed of the work tool they must necessarily pass through the passageway defined by the spaced halves 12 and 14 of the split-yoke. The upper half 12 of the split-yoke is carried by a pair of hinges 19a, 19b, each of which is attached to an end and pivotally secured, respectively, at 21a, 21b to the arm members 16a, 16b of the lower guide portion 14. Associated with the pair of hinges 19a, 19b supporting the upper half 12 of the split-yoke from the arms 16a, 16b is a corresponding pair of leaf springs 20a, 20b. These leaf springs 20a, 20b exert a resilient spring force which constantly urges the two halves of the split-yoke portion together. The upper yoke portion 12 has a pair of adjusting screws 18a, 18b, which bear against the top of the respective arm portions 16a, 16b, and determine the amount of separation between the two halves of the split-yoke. The threaded screws permit the height of the gate to be varied readily in order for the guide to pass lumber boards of a different thickness cross-section. Thus, in operation, the upper and lower halves of the split-yoke are held rigidly apart by a spaced amount determined by the setting of the adjustment screws 18a, 18b, and a gate or passageway of fixed dimension, formed by the spacing therebetween, is maintained.

It will be seen from the structure thus far described that the gate formed by the split-yoke portions 12 and 14 of the guide 10 will be freely swingable in a vertical arc about the pivots 17a, 17b, but otherwise restrained in movement. As is best seen in FIG. 2, the lower yoke portion 14 of the lumber feed guide 10 abuts over the edge of the tool bed 11 in such a manner that the lower boundary of the gate is aligned with the surface of the tool bed 11. The edge of the tool bed 11 acts as a stop for the lumber feed guide 10 which prevents the gate from dropping below the plane described by the surface of the tool bed 11. If desired, this stopping action could alternatively be provided by projecting members located elsewhere, such as near the respective pivots 17a, 17b for the arms 16a, 16b, rather than by bracing the back of the lower half 14 of the split-yoke against the edge of the tool bed 11.

To assist the guiding of the individual lumber boards into the gateway described by the spaced halves of the split-yoke in order that they may pass successively through the guide, the upper half 12 of the split-yoke is preferably formed such that it presents a plane surface to the advancing boards which is downwardly inclined in the direction of travel. Thus, boards whose forward edges project slightly above the height of the gate area due to crookedness or unevenness will be deflected downwardly into the center of the guide as the board is advanced.

A somewhat similar function is served by a conveyor guide member 35 placed across the direction of feed ahead of the gateway of the guide and rigidly restrained, such as by suitable connecting links 36, to lie in the plane of the bed 11 of the work tool station. The conveyor guide 35 preferably presents to lumber boards, advancing off a conveyor or similar feed, a plane surface upwardly inclined in the direction of their feed such that the forward edges of those boards which may be bent slightly below the horizontal will slide upward until they lie in the common plane of the gate (i.e., between the halves of the split-yoke) and the tool bed 11. The conveyor guide 35 also serves to support the advancing lumber boards coming off a conveyor belt and thereby maintain them in the desired horizontal plane. If desired, the connecting links 36, maintaining the conveyor guide 35 in fixed relationship with the surface of the tool bed 11, may be so arranged as to provide the desired stop for the vertical travel of the swingable gate of the lumber guide 10.

FIGS. 4 and 5 illustrate the lumber feed guide of the present invention in operation preventing the passage of a lumber board to the infeed of a planer or miller machine when it either rides underneath, or is carried on top of, a preceding board. Board 40a in FIG. 4 represents a piece of cut lumber which is being fed, in the direction indicated by the arrows designated as "A," through the guide 10 and is either engaged, or about to be engaged, by the infeed rolls (not shown) of the work tool. As shown, due to an unevenness or bend in the lumber piece 40a, its edge is raised up to an extent sufficient to permit the following board 40b, which is in the process of being fed off the conveyor belt 30, to slide in underneath the trailing edge of board 40a due to the faster feed rate of the conveyor as compared to that of the infeed rolls.

In the absence of the lumber feed guide of the present invention, the doubled-up or overlapping arrangement of the ends of these two boards, 40a and 40b, might cause fouling of the infeed rolls and serious damage to the work tool. As is illustrated in FIG. 4, with the presence of the lumber feed guide 10, however, the raised trailing edge of the lumber board 40a causes the gateway, defined by the separation between the spaced halves 12 and 14 of the split-yoke, to be elevated above the plane of the tool bed 11. As a result, the lower half 14 of the split-yoke is interposed directly in the path of the front edge of the following board 40b riding underneath the trailing edge of board 40a. Board 40b is thus blocked by the lumber feed guide 10 from passing onto the bed 11 of the work tool station until the preceding board 40a has completely passed through the gate of the guide. When this event occurs, the split-yoke will drop back to its resting position by the force of gravity, the gateway will again be aligned across the plane of the bed 11 of the work tool station, and board 40b will then be permitted to pass through the lumber feed guide 10 as its path of travel will no longer be intercepted by the lower half 14 of the split-yoke.

In a similar manner, as illustrated in FIG. 5, a bend or crookedness in a following board on occasion may cause its forward edge to be raised sufficiently to cause a board such as 40d to ride on top of a preceding board 40c. In such event, the upper half 12 of the split-yoke serves to block the passage of the doubled-up board 40d until the preceding board 40c has completely passed through the gateway of the lumber feed guide 10. The height of the gate, determined by the setting of the adjustment screws 18a, 18b, is selected such that it corresponds to the nominal thickness of the cut lumber being fed to the work tool station, plus a small clearance to allow the passage of boards of slightly greater thickness than the median. Thus, no more than one board is permitted to pass through the gateway between the split-yoke portions of the guide at any one time. This ensures that the boards of lumber are dispensed in an individual manner to the infeed of the planer, miller, or other work tool.

In some embodiments of the invention it may be desirable to modify the lumber feed guide such that the split-yoke portions are slideably carried within a pair of vertically-disposed channel members arranged at either end of the gate area, rather than by a pair of pivotable arms. In such a variation of the invention, the split-yoke would similarly be restrained from any movement except in a vertical direction, that is, only movement perpendicular to the plane of the tool bed and the direction of travel of the advancing lumber boards would be permitted. It will be realized that, with such a modification, the movement of the gate of the lumber feed guide will be along a vertical line as determined by the orientation of the channel members, instead of along a vertical arc determined by the radius of the pivotable arms 16a, 16b. However, since the movement of the guide in situations when a following boaord is riding underneath a preceding board (such as illustrated in FIG. 4) describes such a small portion of this arc, the action of the guide in moving upward to block the passage through the gate of a doubled-up or overlapping board will be directed along the vertical, or substantially so, and will be the same for both of these embodiments of the invention.

The terms and expressions which have been employed here are used as terms of description and not of limitation, and there is no intention, in the use of such terms and expressions, of excluding equivalents of the features shown and described, or portions thereof, it being recognized that various modifications are possible within the scope of the invention claimed.

What is claimed is:

1. A guide for individually feeding lumber boards or similar articles of predetermined cross-section carried by conveyor means to the infeed of a work tool, said conveyor traveling at a faster rate than said infeed, said guide comprising, a split-yoke having separated upper and lower portions defining a gate across said infeed for lumber being fed to said work tool, said gate having an opening therein of height greater than one time, but less than two times, the thickness of said lumber boards and of width greater than the wide dimension of said boards, a pair of arm members connected to respective sides of said split-yoke and to said work tool in a manner permitting said gate to be freely moveable only in a substantially vertical direction perpendicular to the plane of travel of said lumber being fed through said guide by said conveyor means, and a fixed stop cooperating with said arm members for preventing said vertically-moveable gate from dropping below said plane.

2. Apparatus according to claim 1 including, in combination, adjustable threaded members interposed between said upper and lower portions of said split-yoke, hinges on said arms for pivotally supporting said upper portion, and spring members carried by said arms urging said portions of said split-yoke together, said combination cooperating to permit variation of the height of the opening in said gate for boards of a different thickness cross-section.

3. Apparatus according to claim 1 wherein said upper portion of said split-yoke presents to advancing boards a plane surface downwardly inclined in the direction of travel of said lumber, said inclined surface serving to deflect advancing boards downwardly into the opening in said gate.

4. Apparatus according to claim 1 including a rigidly restrained member positioned across said infeed in front of said split-yoke and presenting to said advancing lumber boards a plane surface upwardly inclined in their direction of travel, said member serving to maintain said boards in the plane of travel as they advance from said conveyor means.

References Cited in the file of this patent
UNITED STATES PATENTS

| | | |
|---|---|---|
| 345,758 | Barnes | July 20, 1886 |
| 725,630 | Smith | Apr. 14, 1903 |
| 1,838,780 | Miller et al. | Dec. 29, 1931 |
| 1,844,069 | Mattison | Feb. 9, 1932 |
| 2,578,314 | Muench | Dec. 11, 1951 |